United States Patent
Kothapalli Venkata et al.

(10) Patent No.: US 10,951,731 B2
(45) Date of Patent: Mar. 16, 2021

(54) PROFILE SWITCH FEATURE IN SUBSIDY LOCKED DEVICES WITH EUICC

(71) Applicant: QUALCOMM Incorporated, San Diego, CA (US)

(72) Inventors: Phani Pradeep Kumar Kothapalli Venkata, Hyderabad (IN); Naga Chandan Babu Gudivada, Hyderabad (IN); Rajendra Prasad Nelurouth, Hyderabad (IN); Venkata Durga Vinod Chikkala, Hyderabad (IN); Nagarjuna Alavala, Prakasam district (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/159,549

(22) Filed: Oct. 12, 2018

(65) Prior Publication Data

US 2020/0120179 A1 Apr. 16, 2020

(51) Int. Cl.
| | |
|---|---|
| H04L 29/08 | (2006.01) |
| H04W 12/08 | (2009.01) |
| H04W 8/18 | (2009.01) |
| H04W 4/00 | (2018.01) |

(52) U.S. Cl.
CPC ........... *H04L 67/306* (2013.01); *H04W 8/183* (2013.01); *H04W 12/08* (2013.01)

(58) Field of Classification Search
CPC ..... H04W 8/183; H04L 67/306; H04L 63/102
USPC ........ 709/204, 206, 209, 217; 455/406, 411, 455/414.1, 418
See application file for complete search history.

(56) References Cited

U.S. PATENT DOCUMENTS

| | | | |
|---|---|---|---|
| 9,585,000 B2* | 2/2017 | Park | H04W 8/18 |
| 9,690,601 B2* | 6/2017 | Sipe | G06F 9/4451 |
| 10,021,558 B2 | 7/2018 | Lalwaney et al. | |
| 2010/0035651 A1* | 2/2010 | Dong | H04L 69/18 |
| | | | 455/558 |
| 2016/0020804 A1* | 1/2016 | Lee | H04B 1/3816 |
| | | | 455/558 |
| 2016/0302070 A1 | 10/2016 | Yang et al. | |
| 2017/0041864 A1 | 2/2017 | Kaliner | |

(Continued)

FOREIGN PATENT DOCUMENTS

| | | | | |
|---|---|---|---|---|
| WO | 2012085593 A1 | 6/2012 | | |
| WO | WO-2012085593 A1 * | 6/2012 | ........... | H04B 1/3816 |
| WO | 2017116097 A1 | 7/2017 | | |

OTHER PUBLICATIONS

"Requirements for Multi SIM Devices"—GSM Association, Nov. 3, 2017 https://www.gsma.com/services/wp-content/uploads/2018/08/TS.37-v3.1.pdf (Year: 2017).*

(Continued)

*Primary Examiner* — Randy A Scott
(74) *Attorney, Agent, or Firm* — Arent Fox, LLP

(57) ABSTRACT

The apparatus determines whether a subscriber identification module (SIM) card is an embedded universal circuit card (eUICC) or a non-eUICC while in a subsidy locked state. The apparatus performs a profile sequence to determine available network profiles if the SIM card is the eUICC. The apparatus may present an option at the user interface UI to switch network profiles on the UE if the current profile of the eUICC does not satisfy a personalization check on the ME.

31 Claims, 9 Drawing Sheets

(56) References Cited

U.S. PATENT DOCUMENTS

2017/0064552 A1* 3/2017 Park .................... H04L 63/0869
2018/0176768 A1   6/2018 Baek et al.
2018/0249322 A1   8/2018 Kim et al.
2018/0288606 A1* 10/2018 Gao ..................... H04W 8/183

OTHER PUBLICATIONS

International Search Report and Written Opinion—PCT/US2019/046521—ISA/EPO—dated Oct. 15, 2019.
"Requirements for Multi SIM Devices Version 3.0 Sep. 20, 2017", 3GPP Draft; TS.37 V3.0, 3rd Generation Partnership Project (3GPP), Mobile Competence Centre, 650, Route Des Lucioles, F-06921 Sophia-Antipolis Cedex, France, Nov. 28, 2017, XP051368719, Retrieved from the Internet: URL: http://www.3gpp.org/ftp/tsg%5F-ct/WG6%5FSmartcard%5FEx%2DT3/Docs/ [retrieved on Nov. 28, 2017], Sections 2.5 and 2.10, 20 pages.

* cited by examiner

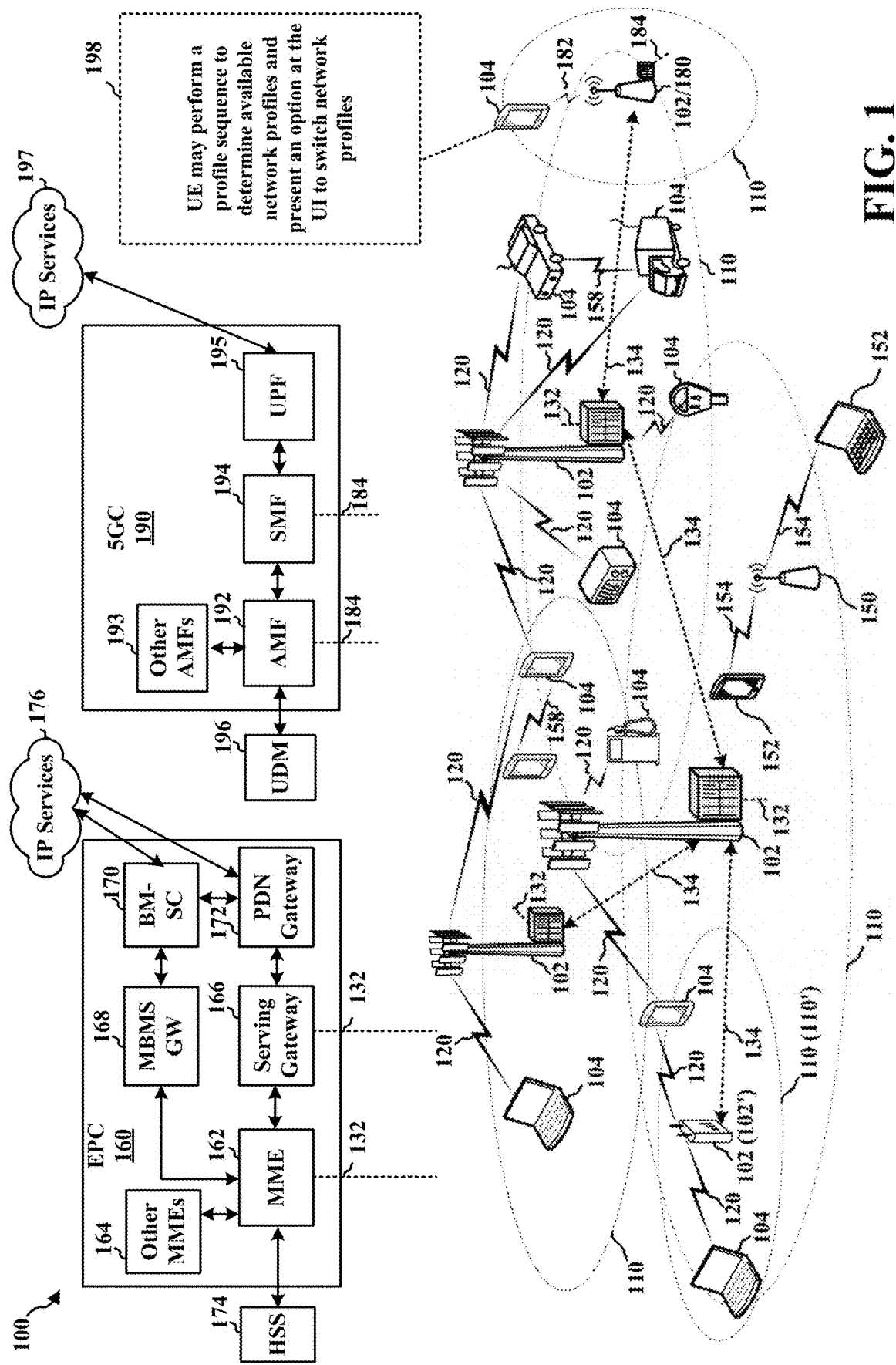

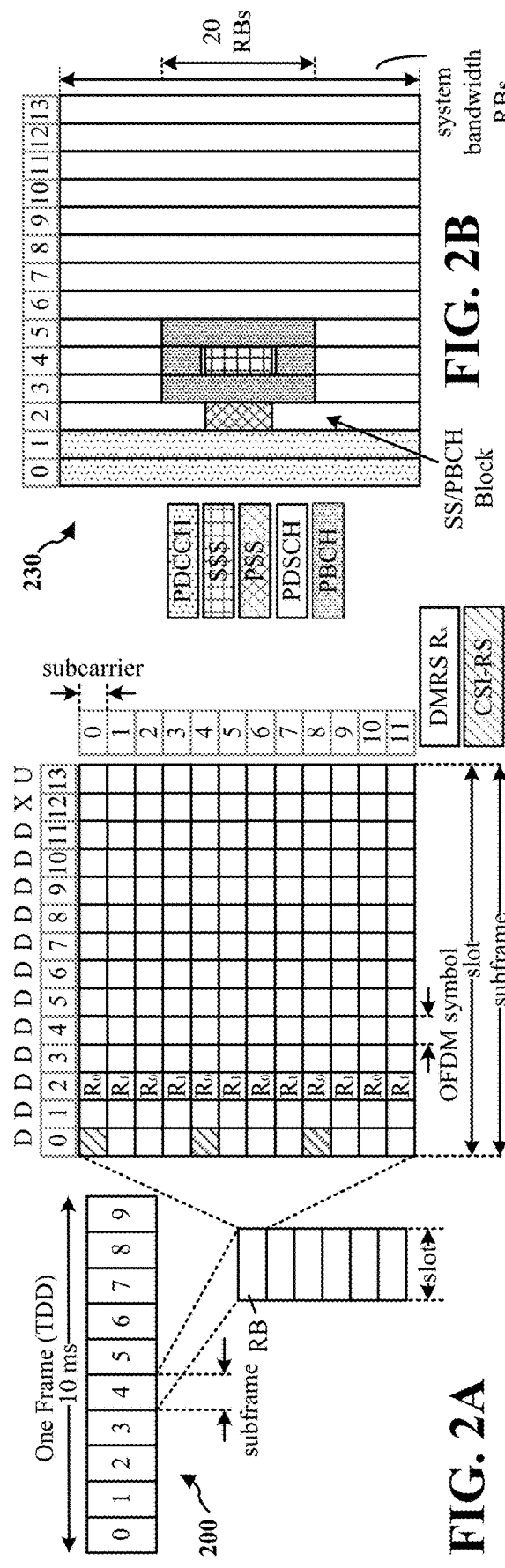
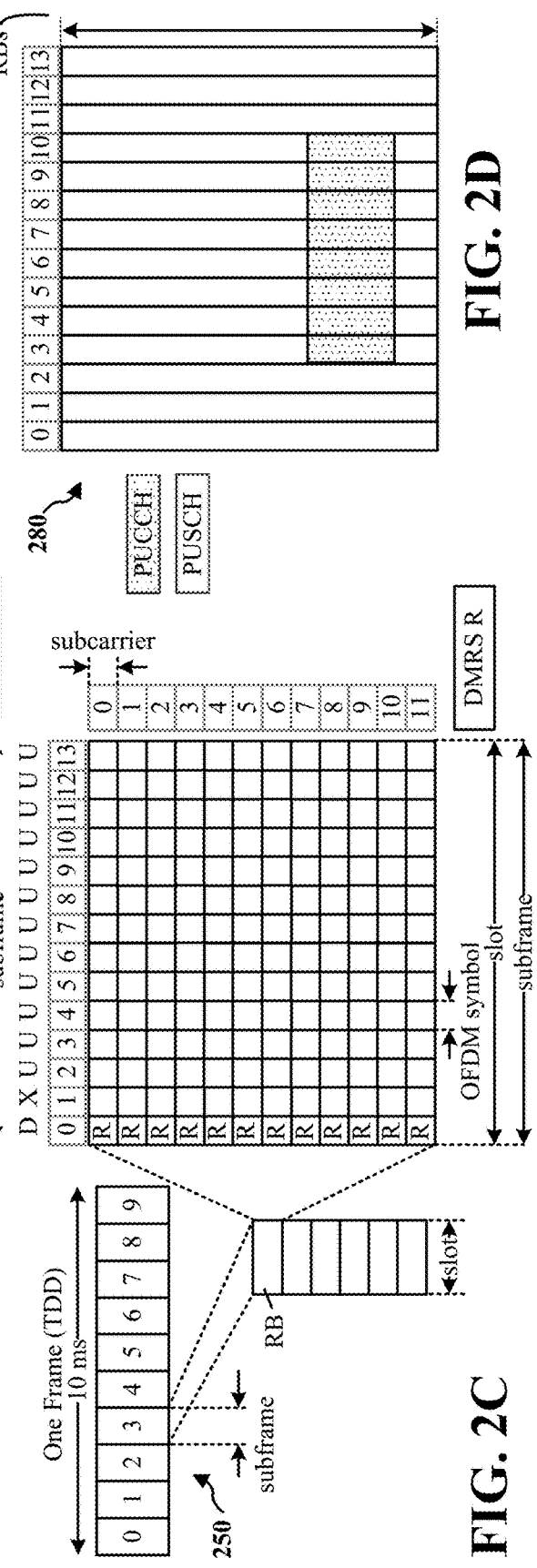

| b8 | b7 | b6 | b5 | b4 | b3 | b2 | b1 | Meaning |
|---|---|---|---|---|---|---|---|---|
| 0 | 0 | 0 | 0 | 0 | 0 | 0 | 0 | No additional global interface parameters supported |
| 1 | - | - | 1 | - | - | - | - | Low impedance drivers and protocol available on the I/O line available (see clause 7.2.1) |
| 1 | 1 | - | - | - | - | - | - | Inter-Chip USB UICC-Terminal interface supported as defined in ETSI TS 102 600 [18] |
| 1 | - | 1 | - | - | - | - | - | UICC-CLF interface supported as defined in ETSI TS 102 613 [19] |
| 1 | - | - | - | 1 | - | - | - | Secure Channel supported as defined in ETSI TS 102 484 [20] |
| 1 | - | - | - | 1 | 1 | - | - | Secured APDU - Platform to Platform required as defined in ETSI TS 102 484 [20] |
| 1 | - | - | - | - | - | 1 | - | eUICC-related functions supported |
| NOTE: Any other value is RFU | | | | | | | | |

FIG. 5

PROFILE SWITCH FEATURE IN SUBSIDY LOCKED DEVICES WITH EUICC

BACKGROUND

Technical Field

The present disclosure relates generally to communication systems, and more particularly, to a method of intelligent enablement of profile switching in subsidy locked devices.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a User Equipment (UE). The apparatus may be configured to select a network profile. The apparatus determines whether a subscriber identification module (SIM) card is an embedded universal integrated circuit card (eUICC) or a non-eUICC card while the UE is in a subsidy locked state. If the SIM card is determined to be the eUICC, the apparatus then performs a profile sequence to determine available network profiles. The apparatus then presents an option at a user interface (UI) to switch network profiles on the UE if the current profile on the eUICC does not satisfy a personalization check on the ME.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 1 is a diagram illustrating an example of a wireless communications system and an access network.

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 5 is a diagram illustrating an Answer To Ready chart in accordance with certain aspects of the disclosure.

DETAILED DESCRIPTION

Figure 3:
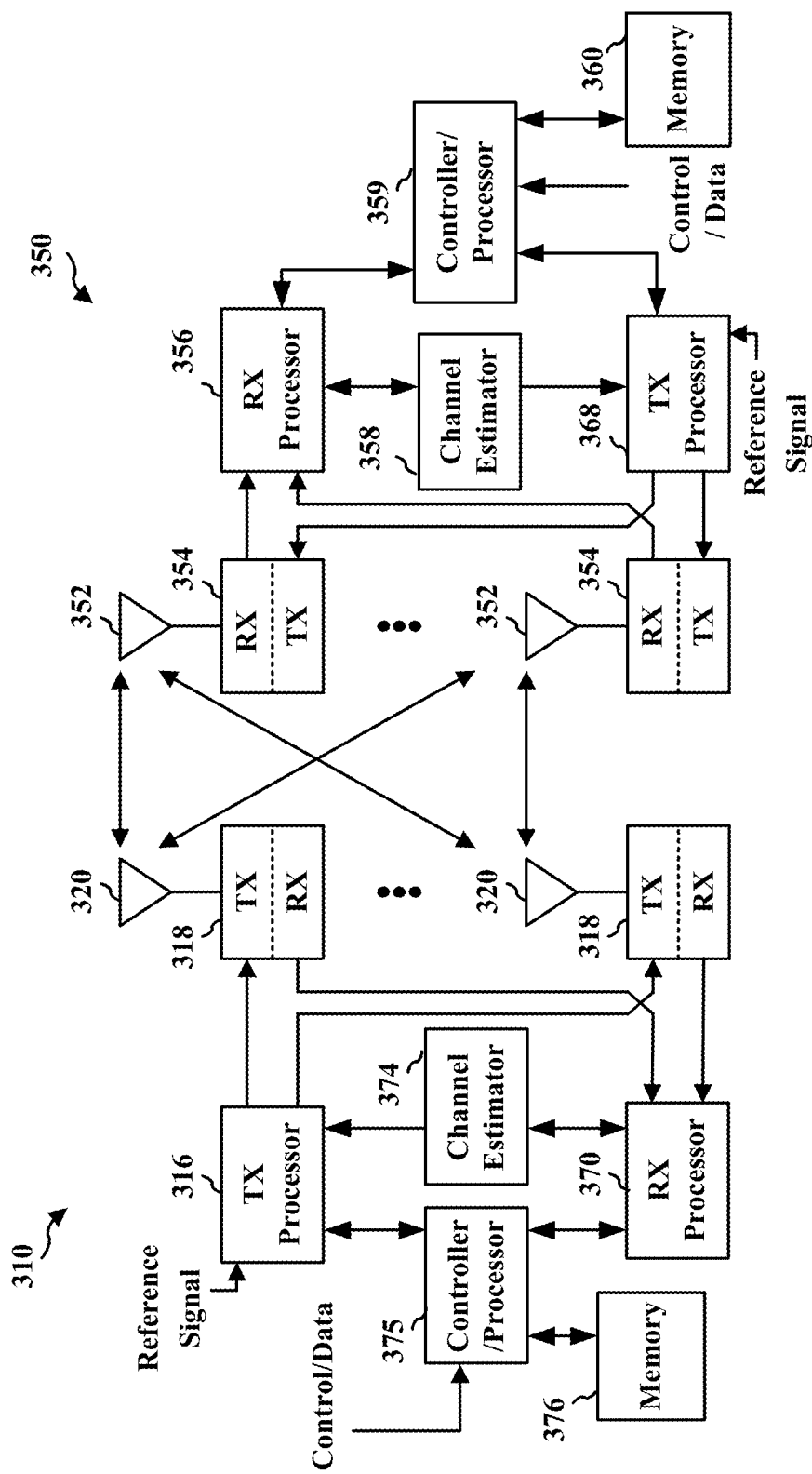
FIG. 3 is a diagram illustrating an example of a base station and user equipment (UE) in an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, UE 104 may be configured to perform a profile sequence to determine available network profiles and present an option at the UI to switch network profiles (198). For example, the UE 104 may perform the profile sequence to determine available network profiles, if the UE determines that the SIM card is eUICC based. The UE 104 may be configured to present an option to switch network profiles if the current profile on the eUICC does not satisfy a personalization check on the UE. The UE may be configured to switch network profiles while in a subsidy locked state.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^µ$ slots/subframe. The subcarrier spacing and symbol length/duration are a function of the numerology. The subcarrier spacing may be equal to $2^{µ}*15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIGs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

A device subsidy may be offered by network operators in an effort to attract users to their network. The device subsidy can create a binding agreement between a subsidized device (e.g., UE) and the network operator, such that any SIM card issued by the network operator may be used on the subsidized device. The UE may be placed in a subsidy locked state until a profile of the SIM card is determined to satisfy the subsidy configuration of the UE. When the UE is in a subsidy locked state, the user cannot perform any user interface (UI) operations other than entering the unlock key or make an emergency call. An embedded universal integrated circuit card (eUICC) is a SIM card that is capable of holding more than one network profile. Non-eUICC SIM cards may be capable of only holding a single network profile, e.g., the network profile of the network operator that provided the device subsidy. While eUICCs are capable of holding multiple network profiles, only one network profile of the eUICC can be active at any given time. Thus, an eUICC allows users to have the ability to switch to a different network profile and change a service provider over the air without physically changing out the SIM card.

Figure 4:
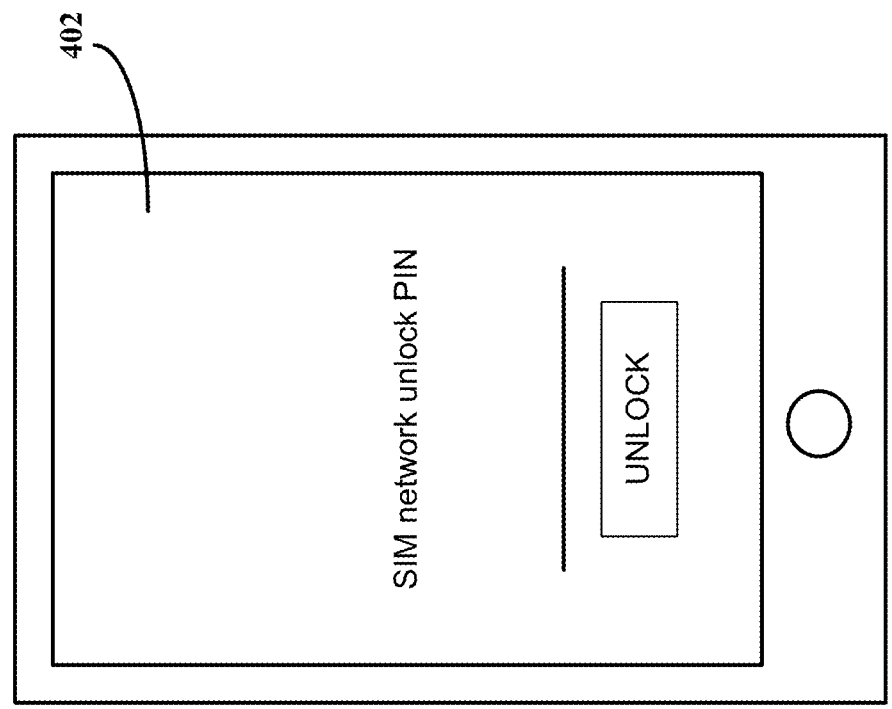
FIG. 4 is a diagram illustrating a UE in accordance with certain aspects of the disclosure.

In some examples, the device may be personalized to network operator X, e.g., subsidized by network operator X. The device may have an eUICC with an active profile associated with network operator Y, yet may also include another existing network profile associated with network operator X that is not active. When the device is in a subsidy locked state, the user cannot perform any UI operations other than entering the unlock key or make an emergency call, because the active profile cannot pass the personalization check for network operator X that subsidized the device. FIG. 4 illustrates an example UE 400 showing a UI 402 in a subsidy locked state. The UI only provides an option for the user to enter an SIM network unlock PIN. Thus, the subsidy locked device prevents the user from switching network profiles to another existing network profile in the eUICC when the device UI is subsidy locked because the current active network profile does not pass the personalization check. Thus, the device remains in a subsidy locked state even though the eUICC comprises another existing network profile that may satisfy the subsidy lock configuration. The personalization check thereby prevents the eUICC from switching to a network profile of a different network operator stored on the eUICC.

In some aspects, there may be a network profile of a different network operator that may be configured to satisfy the subsidy lock provisioning of the first network operator. However, the UE 400 will still not pass the personalization check for the different network operator, because the personalization check does not have any provisioning or does not have any means to determine that the network profile of the different network operator satisfies the subsidy lock provisioning.

This might not be as much of a problem with removable SIM cards that enables a user to remove the SIM and replace the SIM with a SIM card matching the device subsidy requirements, e.g., passing the personalization check for the operator network that subsidized the device. However, an eUICC may be non-removable, e.g., embedded in the device, soldered on the device, etc.

Thus, there exists a need to provide a mechanism that enables the user to switch network profiles while the device is in the subsidy locked state.

The present disclosure provides a mechanism to enable a network profile switch option in the UI of the device (e.g., UE). In some aspects, the mechanism may be configured to allow the user to switch network profiles while the device is in the subsidy locked state. The mechanism may be configured to determine whether the SIM card within the device is configured to support eUICC. The mechanism of the present disclosure may be configured to provide a listing of available network profiles stored on the eUICC on the UI of the subsidy locked device, such that the user may switch to any of the available network profiles, where the available network profiles comply with the subsidy lock configuration.

In order to allow subsidy locked devices to switch to a network profile of the different network operator that may be configured to satisfy the subsidy lock provisioning of the first network operator, the UE 400 may need to be able to overcome the personalization check. In some aspects, the UE 400 may be configured to determine whether a network profile of a different network operator satisfies the subsidy lock provisioning of the first network operator. In some aspects, the UE 400 may include a profile switch option within the UI that may be executed when the UE is in a subsidy locked state.

A UE may be configured to determine whether the device supports eUICC as an aspect of providing the user the ability to switch an active network profile. The determination may be made while the UE is in a subsidy locked state. Thus, the UE may also determine that the current active profile of the SIM card (whether eUICC or non-eUICC) does not pass the personalization check. FIG. 5 is a diagram illustrating an Answer To Ready (ATR) chart in accordance with certain aspects of the disclosure. The UE 104, 400 may be configured to access ATR chart 500 to determine whether support for eUICC is enabled at the UE. In some aspects, the UE 400 may be configured to check the TB3 b2 bit 502 to determine if eUICC related functions are supported. In some aspects, the UI 402 of the UE may be configured to read the ATR chart 500 to determine if eUICC support is enabled. If eUICC support is determined to be enabled, and/or if the SIM card of the UE is determined to be eUICC, the UE may be configured to perform a profile sequence to determine if the eUICC has any available network profiles.

The profile sequence may be configured to determine the available network profiles and their status (e.g., enabled/disabled). For example, the UE may be configured to open a new logical channel and select an issuer security domain root (ISDR) in order to obtain a list of the available network profiles installed at the eUICC. The UE may also be configured to determine the status of each of the available network profiles installed at the eUICC. After determining each of the available network profiles and a status for each of the available profiles, the UE may close the new logical channel and end the profile sequence to obtain the profiles. In some aspects, while obtaining the list of available networks, the profile sequence may be configured to determine the number of the available network profiles. If the number of available network profiles is determined to be greater than one, then the profile sequence may be configured to read the meta data for each of the available network profiles. For example, the device may retrieve a network identification (e.g., a nick name) for each of the available network profiles that are enabled. The UE may then provide an option within the UI for the user to make a selection to switch network profiles. As one example, the UI may present a profile switch option at the locked screen, e.g., as an addition to or as an alternative to the locked screen 402 illustrated in FIG. 4. If the user selects the profile switch option, the UI may present a list of available profiles for selection by the user.

Figure 6:
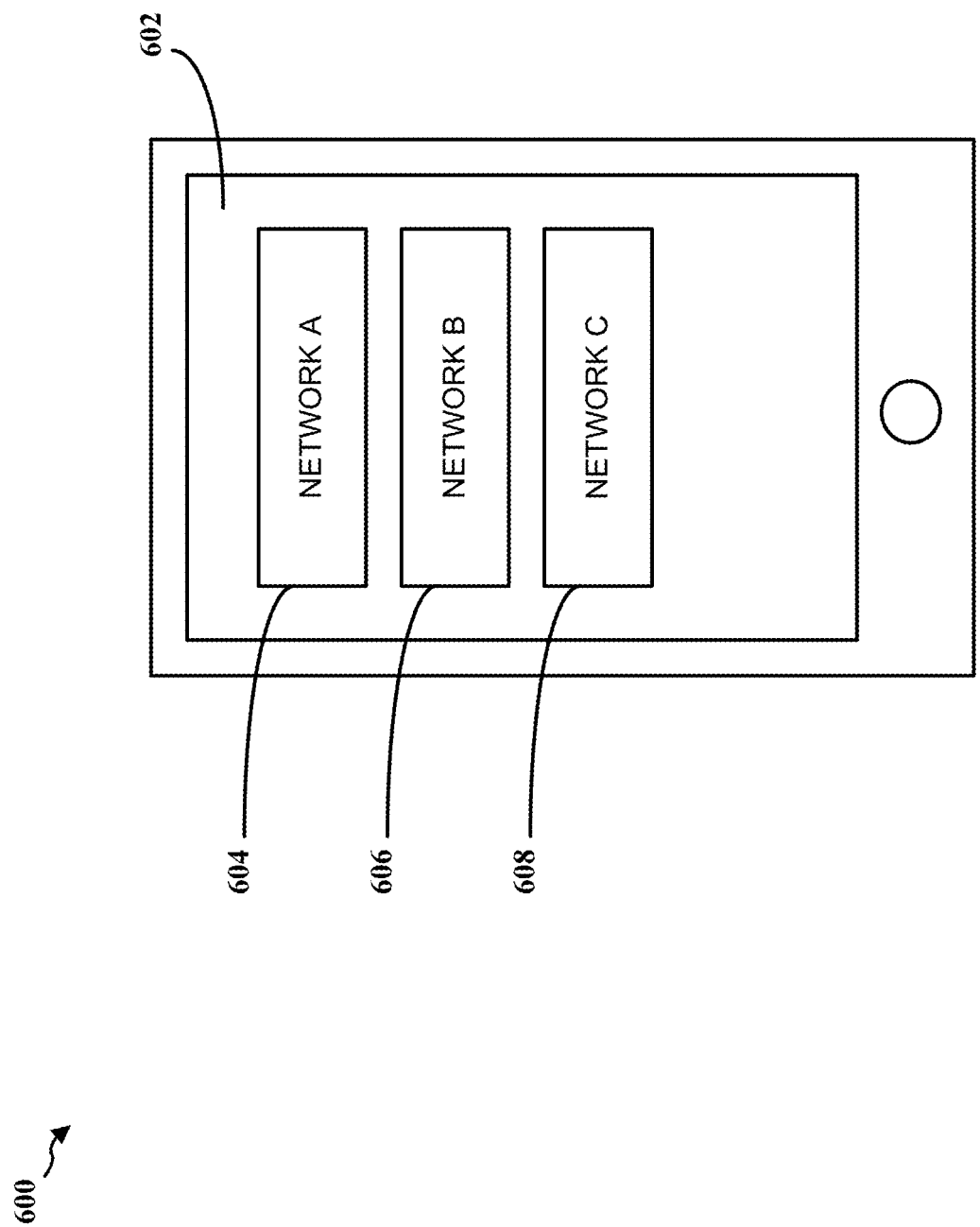
FIG. 6 is a diagram illustrating a UI of a UE in accordance with certain aspects of the disclosure.

FIG. 6 is a diagram illustrating an example UI 602 of a UE 600 in accordance with certain aspects of the disclosure. The UE 600 may be similar to the UE 104, 400 and is configured to provide the profile switch option within the UI 602 when the UE 600 is in a subsidy locked state. The UE may have already determined that the active network profile does not pass the personalization check, and the UE 600 may have already performed the profile sequence to obtain a list of available network profiles at the eUICC and their corresponding status. The UE may then present the option at the UI 602 to switch network profiles on the UE 600. As shown in FIG. 6, the UE 600 may display a list of a plurality of available networks profiles within the UI 602 on a display of the UE 600. The UE may present a list of all of the available network profiles that are enabled at the eUICC. In another example, the UE may present a list of a subset of the available network profiles of the eUICC. In some aspects, the UI 602 displays the active network profiles stored on the eUICC such that the user may interact with the UI 602 to select one of the available network profiles from the list of the network profiles. In the example of FIG. 6, the UI 602 lists Network A 604, Network B 606, and Network C 608 as the network profiles that are available to be selected by the user. In order to switch to another one of the available network profiles, the user selects the desired network profile from the list displayed on the UI 602.

The UE 600 may receive a user selection of a network profile from the list displayed on the UI 602. Upon receipt of the user selection, the UE 600 may be configured to switch to the selected network profile, e.g., the selected network profile will become the active profile at the eUICC and the previous network profile will become inactive. After switching to the selected network profile, the UE 600 may perform an eUICC initialization with the selected network profile. After the eUICC initialization is complete, the UE 600 may be configured to perform a SIM initialization and/or SIMLOCK algorithms using the selected network profile that is now the active network profile. Thus, the UE may use the network profile selected by the UE to re-perform the personalization check, in order to attempt to unlock the subsidy device locked state with the newly selected network profile. When the selected network profile is associated with the network operator that subsidized the device, such that the selected network profile passes the personalization check, the device may enter a subsidy unlock state or otherwise transition out of the subsidy locked state.

The aspects presented herein that provide profile switch option allow a subsidy locked device to switch to another network profile that complies with the subsidy lock configuration. The ability to switch to a different network profile provides flexibility in using different network operators, as desired. For example, a first network operator may not provide sufficient coverage in a certain geographic area, while a second network operator does provide coverage in the same geographic area. Users may be able to switch to the second network operator if so desired. In addition, the UI may be provisioned to provide an option to switch network profiles without being constrained by the personalization check with the network operator that provided the subsidy locked device.

Figure 7:
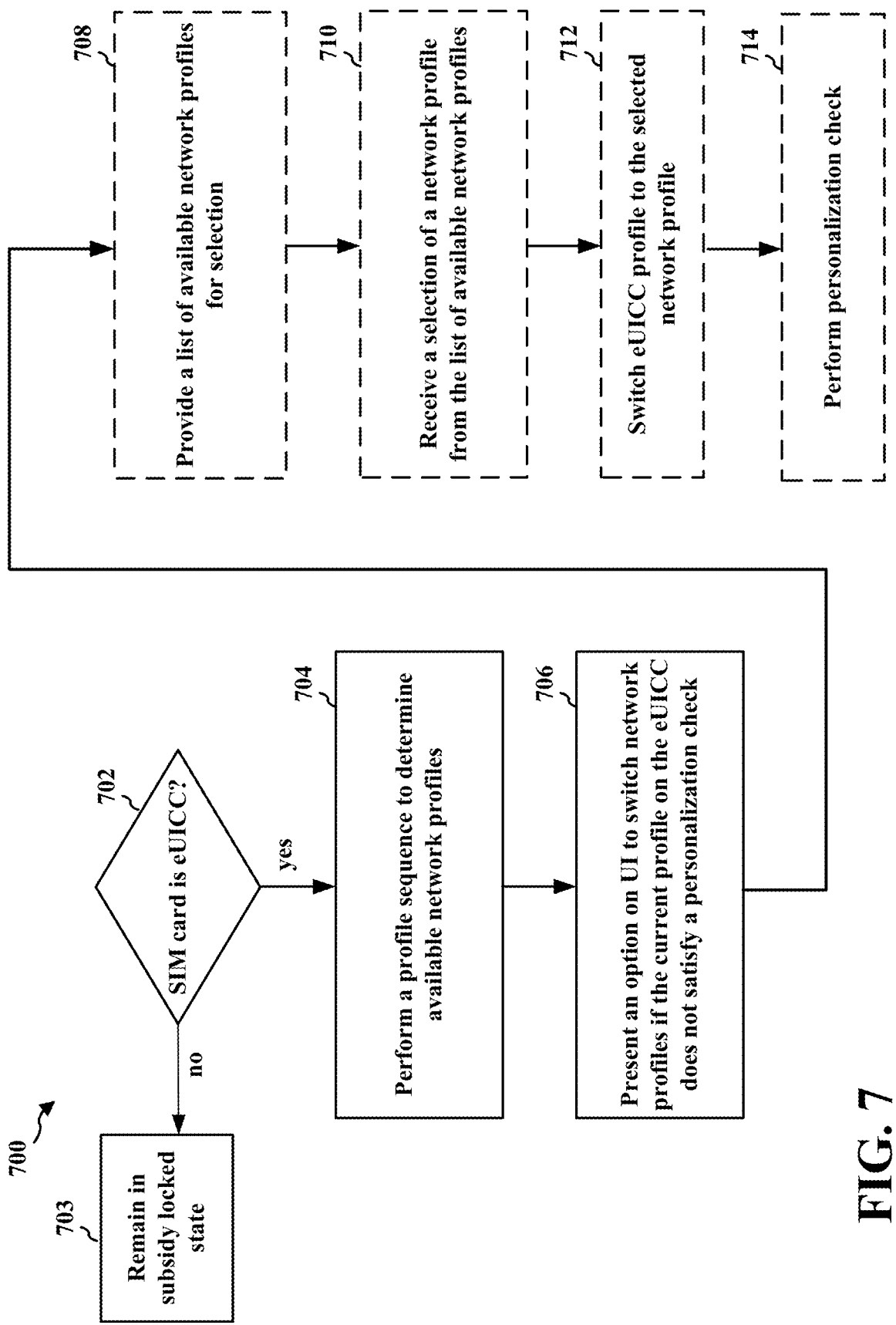
FIG. 7 is a flowchart of a method to switch network profiles at a UE.

FIG. 7 is a flowchart of a method to switch network profiles. The method may be performed by a UE (e.g., UE 104, 350, 400, 600). Optional aspects are illustrated with a dashed line. The method may enable a user to switch an active network profile of an eUICC while the UE is in a subsidy locked state. This ability may enable the user to switch to a network profile that will pass a personalization check and enable the UE to become unlocked.

At 702, the UE may be configured to determine whether a SIM card is a eUICC or a non-eUICC. The device may be in a subsidy locked state, such that the UE will only operate with a SIM card issued by a network operator that provided the subsidized UE. Thus, the UE may have already determined that the current, active network profile of the SIM card does not pass meet the network subsidization requirements, e.g., does not pass a personalization check. In some aspects, the UE may be configured to determine whether the SIM card is the eUICC or the non-eUICC by attempting to read an answer to reset (ATR). The UE may read ATR bytes to determine whether eUICC support is enabled or disabled in order to determine whether the SIM card is an eUICC. In such aspects, the UE may be configured to determine whether eUICC support is enabled by reading bit 2 of a TB3 in the ATR bytes.

If the SIM card is determined to be a non-eUICC card or the UE is determined to not support eUICC, the UE may remain in a subsidy locked state, at 703.

At 704, if the SIM card is determined to be an eUICC, then the UE may be configured to perform a profile sequence to determine available network profiles at the eUICC. In some aspects, to perform the profile sequence to determine the available network profiles, the UE may be configured to open a new logical channel, select an ISDR, and obtain a list of available network profiles. The UE may be configured to determine a status (e.g., enabled/disabled) of each of the available network profiles. The UE may then close the new logical channel at the completion of the profile sequence. In some aspects, the UE may perform a GetProfilesInfo procedure in order to obtain the list of available network profiles At 706, the UE may be configured to present an option on the UI to switch network profiles on the UE if the current profile on the eUICC does not satisfy a personalization check on the UE. In some aspects, along with obtaining the list of the available network profiles, the UE may be configured to determine whether a number of the available network profiles is greater than one. In aspects where the number of the available network profiles is greater than one, the UE may present the option to switch the network profiles, e.g., at the UI of the UE.

At 708, the UE may be configured to provide a list of available network profiles for selection by a user. In one example, the UE may provide the option to switch network profiles by displaying the list of the available network profiles within the UI on a display of the UE. In some aspects where the number of the available network profiles is greater than one, the UE may be configured to read meta data for each of the available network profiles. The UE reads the meta data in order to retrieve nick names for each of the available network profiles. The UE displays the list of available network profiles within the UI of the display of the UE. The network profiles listed may be profiles that comply with the subsidy lock configuration, such that the UE will not fail the personalization check for any of the listed network profiles. Thus, the UE may determine at least one network profile available at the eUICC that will comply with the subsidy lock configuration and may present the at least one network profile as an option to the user for switching network profiles.

At 710, the UE may be configured to receive a selection of a network profile from the user from the list of all the available network profiles. In some aspects, the UE may be configured to receive an indication that a selection has been made, with the indication indicates which network profile has been selected.

At 712, the UE may be configured to switch the eUICC profile to the network profile selected by the user. In some aspects, switching to the selected network profile on the eUICC may be done in response to receiving the user selection of the selected network profile at the UI. In such aspects, after the UE is switched to the selected network profile, the UE may be configured to perform an eUICC initialization with the selected network profile. Thus, at 714, the UE may re-perform a personalization check using the selected network profile as the active network profile of the eUICC. When the requirements of the subsidy lock configuration are met by the selected network profile to which the UE has switched, the UE may enter a subsidy unlocked state.

Figure 8:
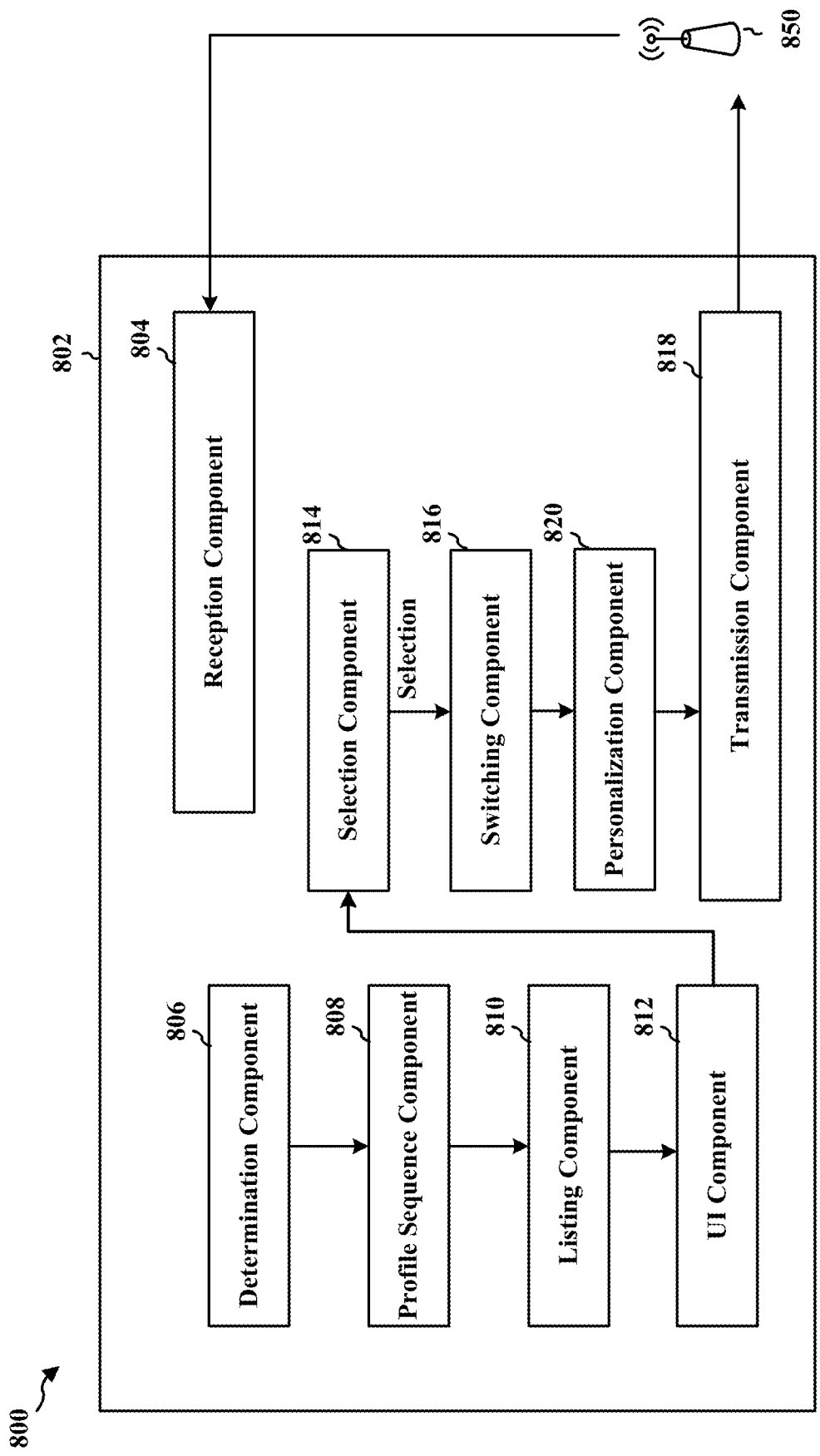
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a UE (e.g., UE 104, 350, 400, 600) configured to communicate with a base station 850 (e.g., 102, 180, 310). The apparatus includes a reception component 804 that receives downlink communication from base station 850 and a transmission component 818 that transmits uplink communication to the base station 850. The apparatus may include a determination component 806 for determining whether a SIM card is an eUICC or a non-eUICC while the UE is in a subsidy locked state. The apparatus may include a profile sequence component 808 to determine the available network profiles, for instances where the SIM is the eUICC. The apparatus may include a listing component 810 to provide a list of the available network profiles for selection by a user. The apparatus may include a UI component 812 to present an option at the UI to switch network profiles on the UE. The apparatus may include a selection component 814 to receive a selection of a network profile from the user from the list of all the available network profiles. The apparatus may include a switching component 816 to switch an eUICC profile to the network profile selected by the user. The apparatus may include a personalization component 820 that is configured to re-perform the personalization check using the selected network profile as the active network profile of the eUICC.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
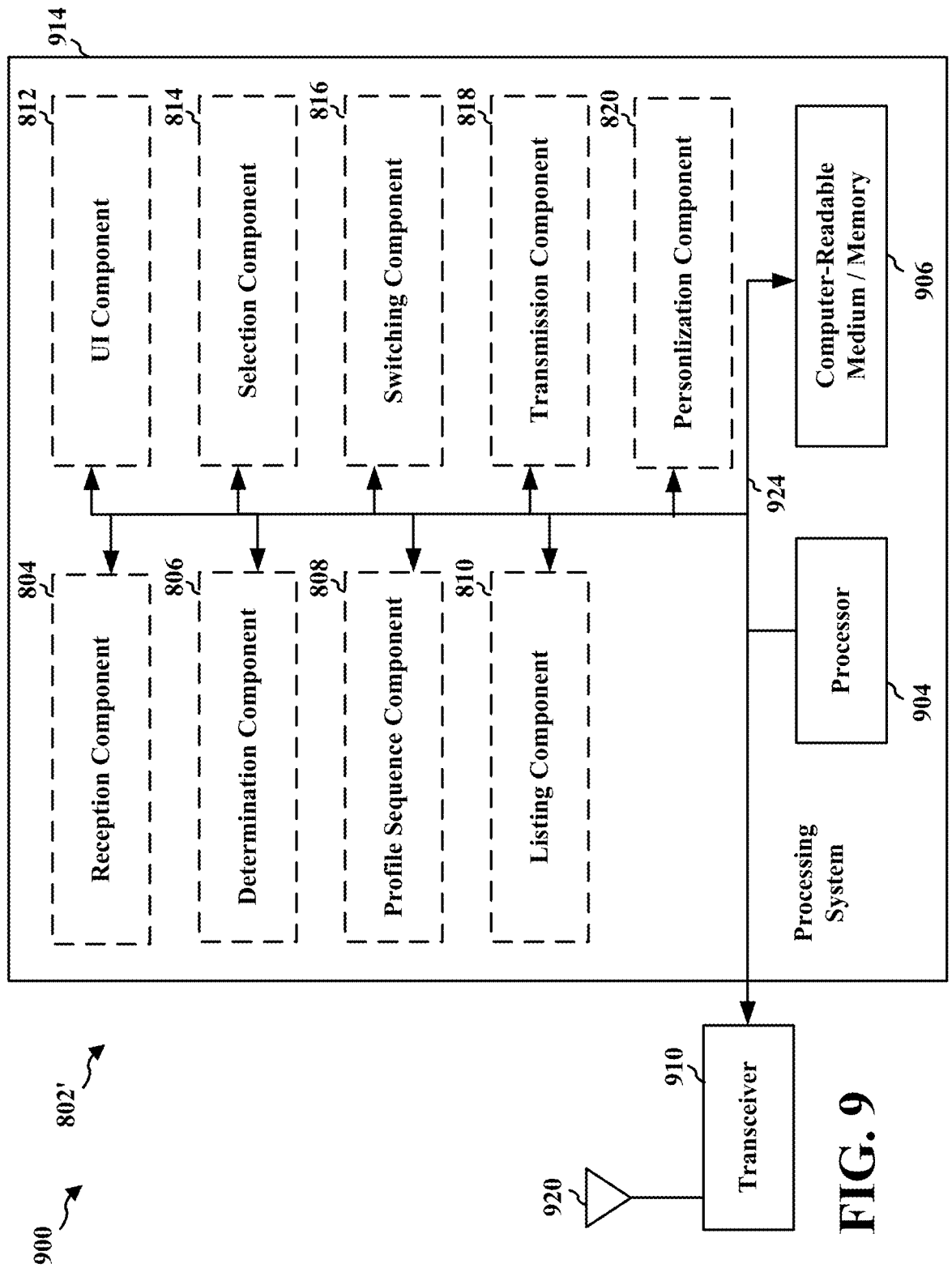
FIG. 9 is a diagram illustrating an example of a hardware implementation for an apparatus employing a processing system.

FIG. 9 is a diagram 900 illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, 816, 818, 820 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 818, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814, 816, 818, and 820. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802/802' for wireless communication includes means for means for determining whether a subscriber identification module (SIM) card is an embedded universal integrated circuit card (eUICC) or a non-eUICC while in a subsidy locked state, means for performing a profile sequence to determine available network profiles if the SIM card is the eUICC, means for presenting an option at a user interface to switch network profiles on the apparatus if the current profile on the eUICC does not satisfy a personalization check on the ME, means for providing a list of the available network profiles for selection by a user, means for receiving a selection of a network profile from the user from the list of all the available network profiles, means for switching an eUICC profile to the network profile selected by the user, means for opening a new logical channel, means for selecting an issuer security domain root (ISDR), means for obtaining a list of available network profiles, means for determining a status of each of the available network profiles, means for closing the new logical channel, means for determining whether a number of the available network profiles is greater than one, wherein the option to switch the network profiles is provided at the UI of the UE when the number of available network profiles is greater than one, means for reading meta data for each of the available network profiles, means for retrieving nick names for each of the available network profiles, means for switching to a selected network profile on the eUICC in response to receiving a user selection of the selected network profile at the user interface, and means for performing an eUICC initialization with the selected network profile. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The present disclosure provides a mechanism to enable a network profile switch option in the UI of the device (e.g., UE). In some aspects, the mechanism may be configured to allow the user to switch network profiles when the device is in the subsidy locked state. The mechanism may be configured to determine whether the SIM card within the device is configured to support eUICC. The mechanism of the present disclosure may be configured to provide a listing of available network profiles stored on the eUICC on the UI of the subsidy locked device, such that the user may switch to any of the available network profiles, where the available network profiles comply with the subsidy lock configuration. At least one advantage of the disclosure is that the profile switch option allows a subsidy locked device to switch to another network profile that complies with the subsidy lock configuration. The ability to switch to a different network profile provides flexibility in using different network operators, as desired. At least one advantage of the disclosure is that the UE can identify the available network profiles stored on the eUICC and may be configured to provide a list on the UI of the UE, such that a user can easily select a different network profile.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method to select a network profile in a User Equipment (UE), comprising:
    determining whether a subscriber identification module (SIM) card is an embedded universal integrated circuit card (eUICC) or a non-eUICC while in a subsidy locked state, wherein the subsidy locked state is associated with a subsidy provided by a network operator;
    performing a profile sequence to determine at least one available network profile currently stored on the eUICC when the SIM card is the eUICC, wherein one of the available network profiles currently stored on the eUICC is to be activated; and
    presenting a profile switch option at a locked screen in a user interface (UI) of the UE in the subsidy locked state to switch from a current network profile on the eUICC to the at least one available network profile currently stored on the eUICC when the current network profile does not satisfy a personalization check on the UE in the subsidy locked state associated with the subsidy provided by the network operator.

2. The method of claim 1, further comprising:
    providing a list of the available network profiles for selection by a user;
    receiving a selection of a selected network profile from the user from the list of the available network profiles; and
    switching an eUICC profile to the selected network profile.

3. The method of claim 1, wherein the UE determines whether the SIM card is the eUICC or the non-eUICC based on attempting to read answer to reset (ATR) bytes to determine whether support is indicated for the eUICC.

4. The method of claim 3, wherein the UE determines whether the support for the eUICC is indicated based on determining whether bit 2 of a TB3 in the ATR bytes indicates the support for the eUICC.

5. The method of claim 1, wherein, when the SIM card is the eUICC, performing the profile sequence to determine the at least one available network profile further comprises:
    opening a new logical channel;
    selecting an issuer security domain root (ISDR);
    obtaining a list of available network profiles;
    determining a status of each of the available network profiles; and
    closing the new logical channel.

6. The method of claim 5, wherein for obtaining the list of the available network profiles, the method further comprising:
    determining whether a number of the available network profiles is greater than one, wherein the profile switch option to switch from the current network profile to the at least one available network profile is provided at the UI of the UE when the number of the available network profiles is greater than one.

7. The method of claim 6, wherein, when the number of the available network profiles is greater than one, the method further comprises:
    reading meta data for the at least one available network profile; and
    retrieving one or more nick names for the at least one available network profile.

8. The method of claim 6, wherein to provide the profile switch option in the UI of the UE to switch to the at least one available network profile, the UE displays the list of the available network profiles within the UI on a display of the UE.

9. The method of claim 1, further comprising:
    switching to a selected network profile on the eUICC in response to receiving a user selection of the selected network profile at the user interface.

10. The method of claim 9, wherein after switching to the selected network profile, the method further comprises:
    performing an eUICC initialization with the selected network profile.

11. The method of claim 1, wherein the at least one available network profile complies with a subsidy lock configuration associated with the network operator that provided the subsidy.

12. A user equipment (UE) to select a network profile, comprising:
    means for determining whether a subscriber identification module (SIM) card is an embedded universal integrated circuit card (eUICC) or a non-eUICC while in a subsidy locked state, wherein the subsidy locked state is associated with a subsidy provided by a network operator;
    means for performing a profile sequence to determine available network profiles currently stored on the eUICC when the SIM card is the eUICC, wherein one of the available network profiles currently stored on the eUICC is to be activated; and
    means for presenting a profile switch option at a locked screen in a user interface (UI) of the UE in the subsidy locked state to switch from a current network profile on the eUICC to the one of the available network profiles currently stored on the eUICC when the current network profile does not satisfy a personalization check on the UE in the subsidy locked state associated with the subsidy provided by the network operator.

13. The user equipment of claim 12, further comprising:
    means for providing a list of the available network profiles for selection by a user;

means for receiving a selection of a selected network profile from the user from the list of all the available network profiles; and means for switching an eUICC profile to the selected network profile.

14. The user equipment of claim 12, wherein the UE determines whether the SIM card is the eUICC or the non-eUICC based on attempting to read answer to reset (ATR) bytes to determine whether support is indicated for the eUICC.

15. The user equipment of claim 14, wherein the UE determines whether the support for the eUICC is indicated based on determining whether bit 2 of a TB3 in the ATR bytes indicates the support for the eUICC.

16. The user equipment of claim 12, wherein, when the SIM card is the eUICC, the means for performing the profile sequence to determine the available network profiles is configured to:
open a new logical channel;
select an issuer security domain root (ISDR);
obtain a list of available network profiles;
determine a status of each of the available network profiles; and
close the new logical channel.

17. The user equipment of claim 16, wherein to obtain the list of the available network profiles, the UE is further configured to:
determine whether a number of the available network profiles is greater than one, wherein the profile switch option to switch from the current network profile to one of the available network profiles is provided at the UI of the UE when the number of the available network profiles is greater than one.

18. The user equipment of claim 17, wherein, when the number of the available network profiles is greater than one, the UE is further configured to:
read meta data for each of the available network profiles; and
retrieve nicknames for each of the available network profiles.

19. The user equipment of claim 17, wherein to provide the profile switch option in the UI of the UE to switch to one of the available network profiles, the UE displays the list of the available network profiles within the UI on a display of the UE.

20. The user equipment of claim 12, further comprising:
means for switching to a selected network profile on the eUICC in response to receiving a user selection of the selected network profile at the user interface.

21. The user equipment of claim 20, wherein after switching to the selected network profile, the UE is further configured to:
perform an eUICC initialization with the selected network profile.

22. An apparatus to select a network profile at a user equipment (UE), comprising:
a memory; and
at least one processor coupled to the memory and configured to:
determine whether a subscriber identification module (SIM) card is an embedded universal integrated circuit card (eUICC) or a non-eUICC while in a subsidy locked state, wherein the subsidy locked state is associated with a subsidy provided by a network operator;
perform a profile sequence to determine available network profiles currently stored on the eUICC when the SIM card is the eUICC, wherein one of the available network profiles currently stored on the eUICC is to be activated; and
present a profile switch option at a locked screen in a user interface (UI) of the UE in the subsidy locked state to switch from a current network profile on the eUICC to one of the available network profiles currently stored on the eUICC when the current network profile does not satisfy a personalization check on the UE in the subsidy locked state associated with the subsidy provided by the network operator.

23. The apparatus of claim 22, wherein the at least one processor is further configured to:
provide a list of the available network profiles for selection by a user;
receive a selection of a selected network profile from the user from the list of all the available network profiles; and
switch an eUICC profile to the selected network profile.

24. The apparatus of claim 22, wherein, when the SIM card is the eUICC, to perform the profile sequence to determine the available network profiles, the at least one processor is further configured to:
open a new logical channel;
select an issuer security domain root (ISDR);
obtain a list of available network profiles;
determine a status of each of the available network profiles; and
close the new logical channel.

25. The apparatus of claim 22, wherein the at least one processor is further configured to:
switch to a selected network profile on the eUICC in response to receiving a user selection of the selected network profile at the user interface.

26. The apparatus of claim 25, wherein after switching to the selected network profile, the at least one processor is further configured to:
perform an eUICC initialization with the selected network profile.

27. A non-transitory computer-readable medium storing computer executable code, the code when executed by at least one processor of a user equipment (UE), causes the at least one processor to:
determine whether a subscriber identification module (SIM) card is an embedded universal integrated circuit card (eUICC) or a non-eUICC while in a subsidy locked state, wherein the subsidy locked state is associated with a subsidy provided by a network operator;
perform a profile sequence to determine available network profiles currently stored on the eUICC when the SIM card is the eUICC, wherein one of the available network profiles currently stored on the eUICC is to be activated; and
present a profile switch option at a locked screen in a user interface (UI) of the UE in the subsidy locked state to switch from a current network profile on the eUICC to one of the available network profiles currently stored on the eUICC when the current network profile does not satisfy a personalization check on the UE in the subsidy locked state associated with the subsidy provided by the network operator.

28. The non-transitory computer-readable medium of claim 27, wherein the at least one processor is further configured to:
provide a list of the available network profiles for selection by a user;

receive a selection of a selected network profile from the user from the list of all the available network profiles; and switch an eUICC profile to the selected network profile.

29. The non-transitory computer-readable medium of claim 27, wherein, when the SIM card is the eUICC, to perform the profile sequence to determine the available network profiles the at least one processor is further configured to:

open a new logical channel;

select an issuer security domain root (ISDR);

obtain a list of available network profiles;

determine a status of each of the available network profiles; and close the new logical channel.

30. The non-transitory computer-readable medium of claim 27, wherein the at least one processor is further configured to:

switch to a selected network profile on the eUICC in response to receiving a user selection of the selected network profile at the user interface.

31. The non-transitory computer-readable medium of claim 30, wherein after switching to the selected network profile the at least one processor is further configured to:

perform an eUICC initialization with the selected network profile.

* * * * *